United States Patent
Dropps et al.

(10) Patent No.: US 8,774,206 B2
(45) Date of Patent: *Jul. 8, 2014

(54) HIGH SPEED FIBRE CHANNEL SWITCH ELEMENT

(75) Inventors: Frank R. Dropps, Maple Grove, MN (US); Ernest G. Kohlwey, Eagan, MN (US); Mark A. Owen, Apple Valley, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 13/604,261

(22) Filed: Sep. 5, 2012

(65) Prior Publication Data

US 2013/0077637 A1     Mar. 28, 2013

Related U.S. Application Data

(63) Continuation of application No. 10/956,501, filed on Oct. 1, 2004, now Pat. No. 8,295,299.

(51) Int. Cl.
 *H04L 12/28* (2006.01)
(52) U.S. Cl.
 USPC .................. 370/427; 370/391; 370/229
(58) Field of Classification Search
 USPC ......... 370/229, 230, 231, 232, 233, 234, 235, 370/236, 403, 404, 405, 406, 389, 390, 391, 370/392
 See application file for complete search history.

(56) References Cited

U.S. PATENT DOCUMENTS

| 5,751,710 | A  | 5/1998  | Crowther et al. |
| 5,920,705 | A  | 7/1999  | Lyon et al. |
| 6,144,668 | A  | 11/2000 | Bass et al. |
| 6,185,203 | B1 | 2/2001  | Berman |
| 6,614,796 | B1 | 9/2003  | Black et al. |
| 2003/0091062 | A1 | 5/2003 | Lay et al. |
| 2003/0191883 | A1 | 10/2003 | April |
| 2004/0030766 | A1 | 2/2004 | Witkowski |
| 2005/0099970 | A1 | 5/2005 | Halliday |
| 2008/0320143 | A1 | 12/2008 | Di Benedetto et al. |

FOREIGN PATENT DOCUMENTS

| CN | 1302160 | 7/2001 |
| EP | 1379042 | 1/2004 |

OTHER PUBLICATIONS

"Examination Report from Indian Patent Office dated Mar. 12, 2013 for Indian Patent Application No. 415/MUMNP/2007".
"Office Action from USPTO dated Jun. 24, 2013 for U.S. Appl. No. 13/177,314".
Ridgeway, Curt "0GFC-40GFC using 4-lane XAUI's", *LSI Logic Presentation-T11/03-069v0*, (Feb. 3, 2003).

(Continued)

*Primary Examiner* — Dady Chery
(74) *Attorney, Agent, or Firm* — Klein, O'Neill & Singh, LLP

(57) ABSTRACT

A high-speed Fiber Channel switch element in a Fiber Channel network is provided. The Fiber Channel switch element includes, a rate select module that allows a port in the Fiber Channel switch element to operate at a rate equal to and/or higher than 10 gigabits per second ("G"). The port may operate at 20 G, 40 G or at a rate greater than 40 G. Also, a cut status is provided for cut-through routing between ports operating at different speed. Plural transmit and receive lines are used for port operation at a rate equal to or higher than 10 G.

18 Claims, 5 Drawing Sheets

(56) References Cited

OTHER PUBLICATIONS

Curtis, A. R., "Design Considerations for 10-Gbit Fibre Channel", *Curtis A. Ridgeway, Distinguished I/O Architect, Storage and Computing ASIC's Division, LSI Logic Corp.*, (Apr. 14, 2003).
"Office Action from USPTO dated Mar. 16, 2009 for U.S. Appl. No. 10/956,501".
"Examination Report from European Patent Office dated Mar. 27, 2009 for European Application No. 05798761.2".
"Office Action from Chinese State Intellectual Property Office dated Jul. 10, 2009 for Chinese Application No. 200580032888.6".
"Final Office Action from USPTO dated Sep. 15, 2009 for U.S. Appl. No. 10/956,501".
"Office Action from USPTO dated Jan. 6, 2010 for U.S. Appl. No. 10/956,501".
"Office Action from USTPO dated Jan. 26, 2010 for U.S. Appl. No. 10/956,501".
"Communication Under Rule 71(3) EPC indicating allowance of application dated Apr. 9, 2010 from European Patent Office for European Application No. 05798761.2".
"Final Office Action from USPTO dated Aug. 16, 2010 for U.S. Appl. No. 10/956,501".
"Office Action from USPTO dated Apr. 12, 2011 for U.S. Appl. No. 10/956,501".
"Office Action from State Intellectual Property Office of China dated Jul. 1, 2011 for Chinese Application No. 200580032888.6".
"Office Action from USPTO dated Oct. 24, 2011 for U.S. Appl. No. 10/956,501".
"Office Action from USPTO dated Apr. 24, 2012 for U.S. Appl. No. 10/956,501".
"Office Action from State Intellectual Property Office dated Mar. 31, 2012 for Chinese Application No. 200580032888.6".
"Office Action from State Intellectual Property Office dated Aug. 8, 2012 for Chinese Application No. 200580032888.6".
"Notice of Allowance from USPTO dated Aug. 30, 2012 for U.S. Appl. No. 10/956,501".
"Notice of Allowance from USPTO dated Oct. 8, 2013 for U.S. Appl. No. 13/177,314".

| Amount of max Length Frame Received | RPORT RX_Rate = 10G | | | | RPORT RX_Rate = 20G | | | | RPORT RX_Rate = 40G | | | |
|---|---|---|---|---|---|---|---|---|---|---|---|---|
| | > 1 Slot Empty | | <= 1 Slot Empty | | > 1 Slot Empty | | <= 1 Slot Empty | | > 1 Slot Empty | | <= 1 Slot Empty | |
| | 40G Cut | 20G Cut | 40G Cut | 20G Cut | 40G Cut | 20G Cut | 40G Cut | 20G Cut | 40G Cut | 20G Cut | 40G Cut | 20G Cut |
| 0/0 < rcvd < 1/2 | 0 | 0 | 0 | 0 | 0 | 1 | 0 | 0 | 1 | 1 | 0 | 0 |
| 1/2 < rcvd < 3/4 | 0 | 1 | 0 | 0 | 1 | 1 | 0 | 0 | 1 | 1 | 0 | 0 |
| 3/4 < rcvd < EOF | 1 | 1 | 0 | 0 | 1 | 1 | 0 | 0 | 1 | 1 | 0 | 0 |
| EOF Received | 1 | 1 | 1 | 1 | 1 | 1 | 1 | 1 | 1 | 1 | 1 | 1 |

FIGURE 3

HIGH SPEED FIBRE CHANNEL SWITCH ELEMENT

CROSS-REFERENCE TO RELATED APPLICATION

This application is a continuation of application Ser. No. 10/956,501, filed on Oct. 1, 2004, now U.S. Pat. No. 8,295,299, the entire contents of which are hereby incorporated by reference.

BACKGROUND

1. Field of the Invention

The present invention relates to Fibre Channel networks, and more particularly to a Fibre Channel switch element that can operate at a high speed.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both Channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

In Fibre Channel, a path is established between two nodes where the path's primary task is to transport data from one point to another at high speed with low latency, performing only simple error detection in hardware.

Fibre Channel fabric devices include a node port or "N_Port" that manages fabric connections. The N_port establishes a connection to a fabric element (e.g., a switch) having a fabric port or "F_port". Fabric elements include the intelligence to handle routing, error detection, recovery, and similar management functions.

A Fibre Channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port Fibre Channel switch.

Fibre Channel switches use memory buffers to hold frames received and sent across a network. Associated with these buffers are credits, which are the number of frames that a buffer can hold per fabric port.

Current Fibre Channel standards define switch port/link operations to occur at 1 gigabit per second ("G"), 2 G, 4 G and 10 G. However, as bandwidth increases a need for 20 G, 40 G or higher port/link operation will occur. Conventional standards and Fibre Channel switches do not provide Fibre Channel switches that can operate at such high speeds.

Therefore, there is a need for a Fibre Channel switch whose ports can be selected to operate at high speeds, for example, at 10 G, 20 G or 40 G.

SUMMARY OF THE PRESENT INVENTION

In one aspect of the present invention, a high-speed Fibre Channel switch element is provided. The Fibre Channel switch element includes, a rate select module that allows a port in the Fibre Channel switch element to operate at a rate equal to and/or higher than 10 gigabits per second ("G"). The port may operate at 20 G, 40 G or at a rate greater than 40 G.

Also, a cut status is provided for cut-through routing between ports operating at different speed. Plural transmit and receive lines are used for port operation at a rate equal to or higher than 10 G.

In another aspect of the present invention, a Fibre Channel network is provided. The network includes a Fibre Channel switch element including a rate select module that allows a port in the Fibre Channel switch element to operate at a rate equal to and/or higher than 10 G, as described above.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 3 shows a table for cut-through routing, according to one aspect of the present invention.

DETAILED DESCRIPTION OF THE PREFERRED EMBODIMENTS

Definitions

The following definitions are provided as they are typically (but not exclusively) used in the Fibre Channel environment, implementing the various adaptive aspects of the present invention.

"E_Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"N-Port": A direct fabric attached port, for example, a disk drive or a HBA.

"NL_Port": A L_Port that can perform the function of a N_Port.

"Port": A general reference to N. Sub.-Port or F.Sub.-Port.

"Switch": A fabric element conforming to the Fibre Channel Switch standards.

To facilitate an understanding of the preferred embodiment, the general architecture and operation of a Fibre Channel switch system/element will be described. The specific architecture and operation of the preferred embodiment will then be described with reference to the general architecture.

Fibre Channel System

Figure 1A:
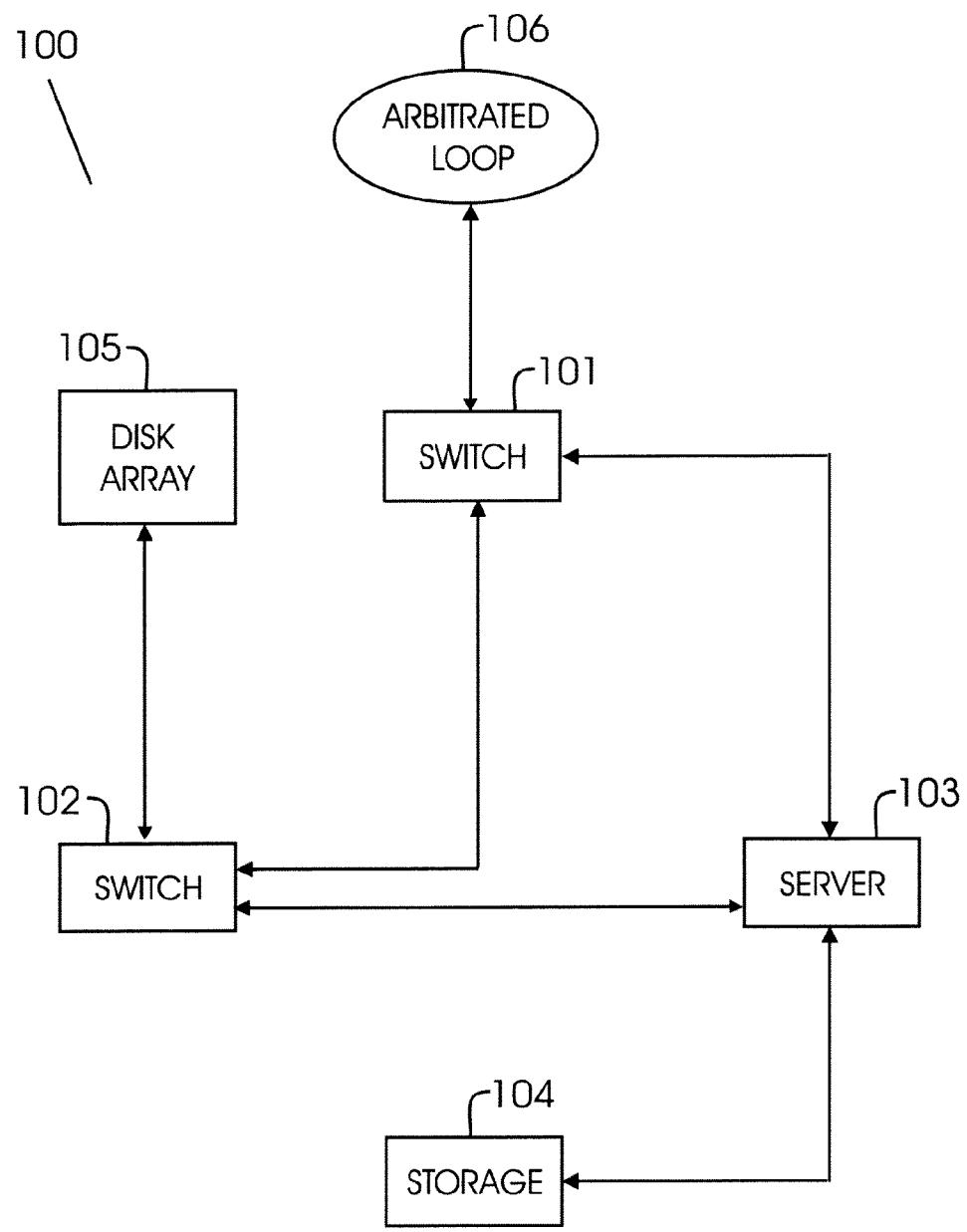
FIG. 1A shows an example of a Fibre Channel network.

FIG. 1A is a block diagram of a Fibre Channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N_Port in server 103 may establish a path with disk array 105 through switch 102.

Switch Element

Figure 1B:
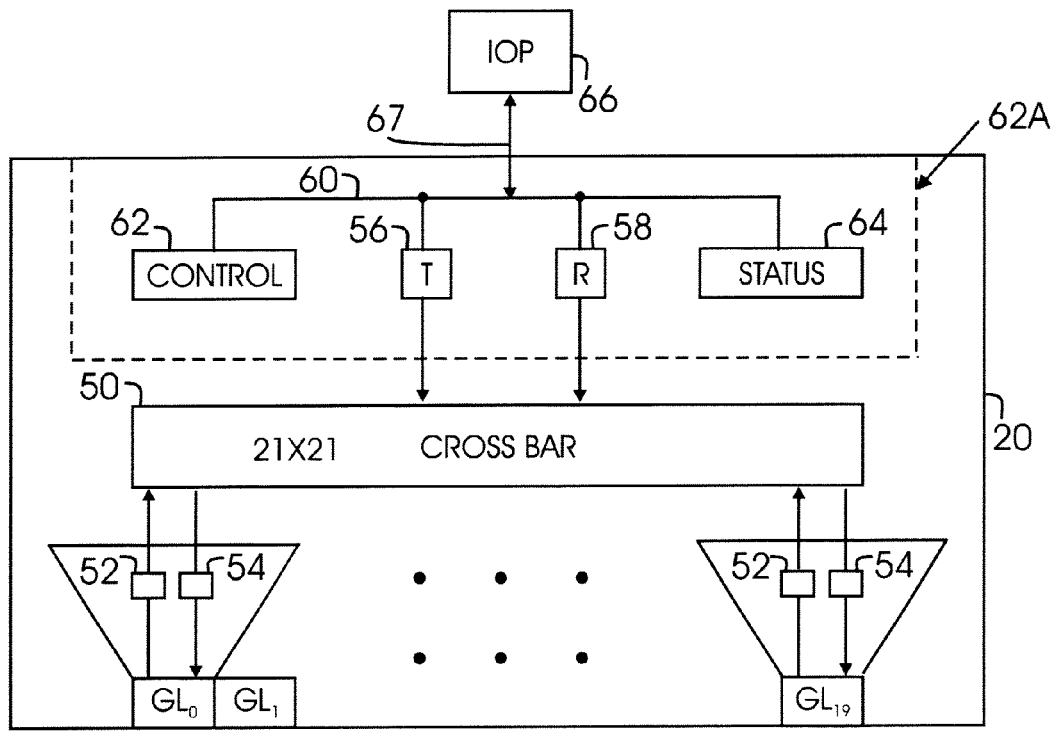
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar is a connectionless crossbar (packet switch) of known conventional design, sized to connect 21×21 paths. This is to accommodate 20 GL ports plus a port for connection to a fabric controller, which may be external to ASIC 20.

Figure 1C:
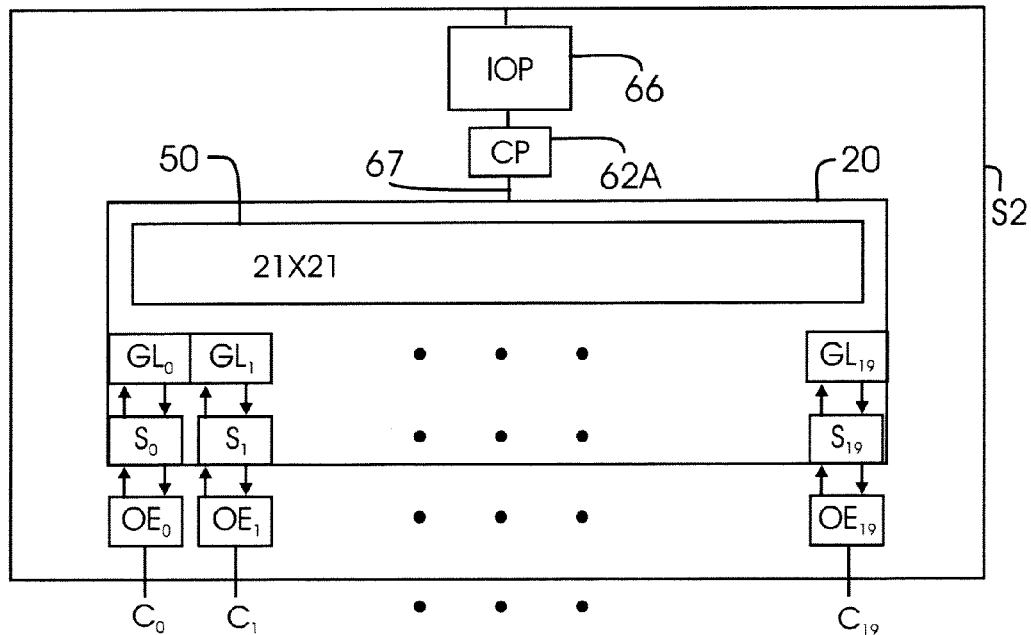
FIG. 1C shows a block diagram of a 20-channel switch chassis, according to one aspect of the present invention.

In the preferred embodiments of switch chassis described herein, the fabric controller is a firmware-programmed microprocessor, also referred to as the input/output processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
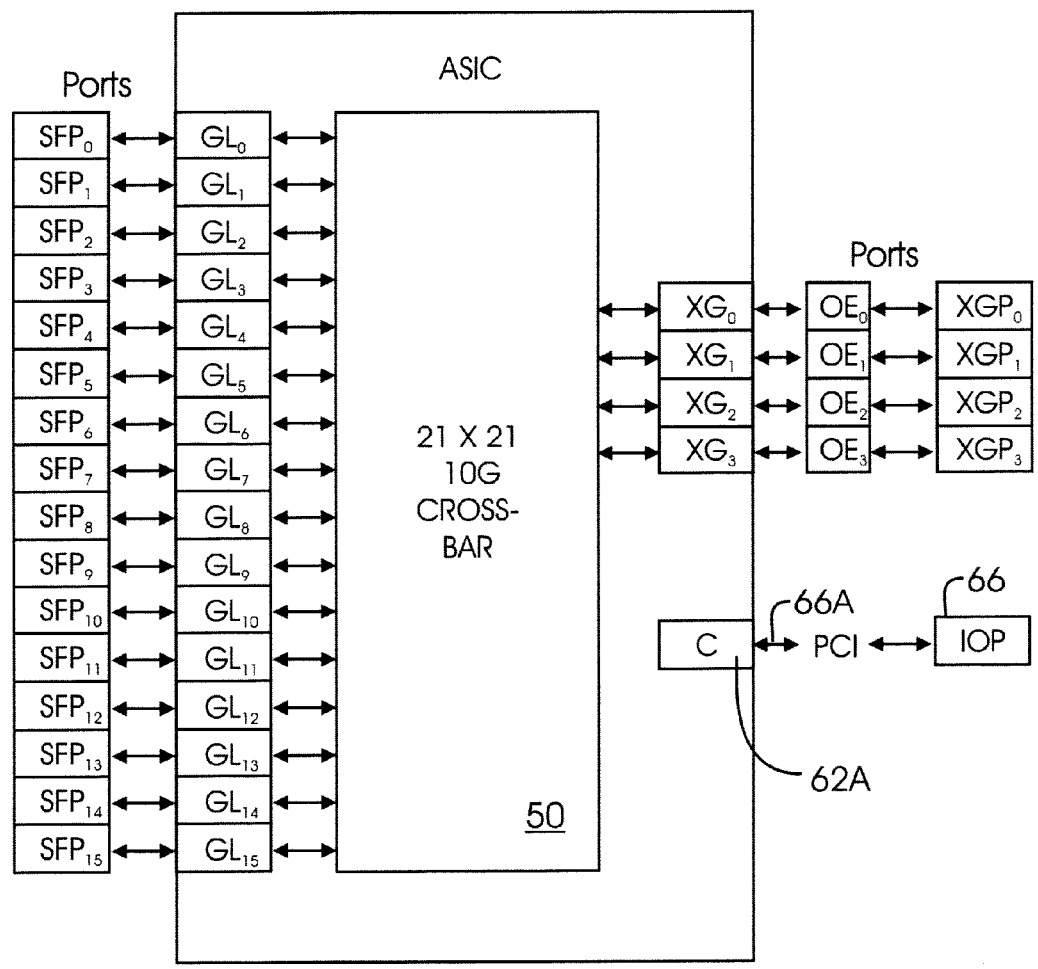
FIG. 1D shows a block diagram of a Fibre Channel switch element with sixteen GL_Ports and four XG ports, according to one aspect of the present invention.

FIG. 1D shows a block diagram of ASIC 20 with sixteen GL ports and four high-speed port control modules designated as XG0-XG3 (for example, 10 G, 20 G or 40 G). ASIC 20 include a control port 62A that is coupled to IOP 66 through a PCI connection 66A.

Details of how switch 20 is operated is provided in U.S. patent application Ser. No. 10/894,587, filed on Jul. 20, 2004, the disclosure of which is incorporated herein by reference in its entirety.

Figure 2:
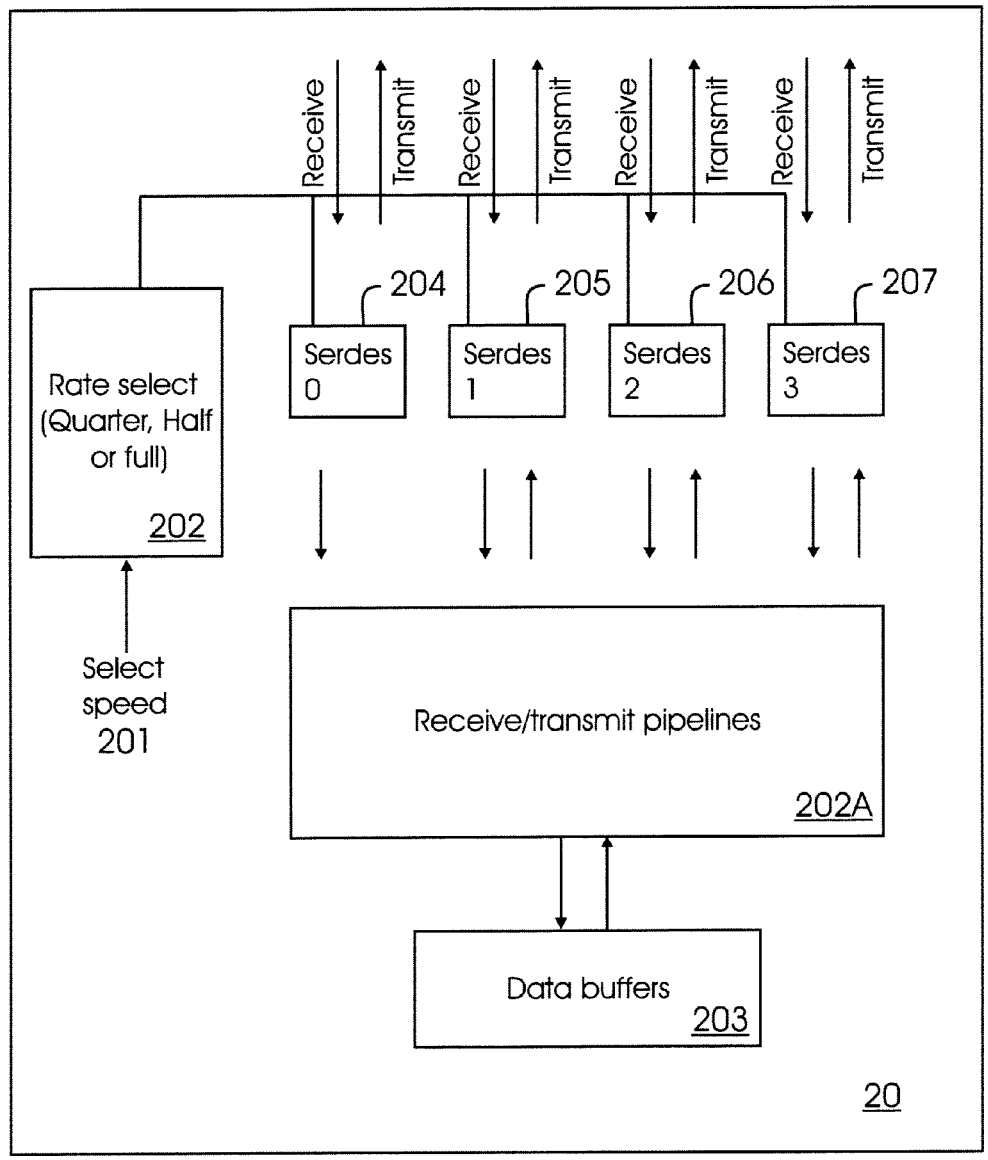
FIG. 2 shows a block diagram of a Fibre Channel switch with a rate select module, according to one aspect of the present invention.

FIG. 2 shows another block diagram of switch element 20, according to one aspect of the present invention. Switch element 20 has receive and transmit pipelines 202A that operate in the manner described in the aforementioned patent application using plural data buffers 203.

A rate select module 202 is provided that selects a particular speed for a port based on a select speed signal 201 that is generated from the common port 62A. Firmware for switch element 20 may be used to generate signal 201. Module 202 provides the appropriate clock and configuration signals for a 10 G, 20 G, 40 G or port/link operation at any rate.

A port can negotiate with another port to operate at 10 G/20 G/40 G or any other rate. A port may operate at 10 G, 20 G, 40 G, 10 G and 20 G, 20 G and 40 G or any other combination. The negotiation process may be similar to that described in the FC-FS Fibre Channel standard. The 'RF'' primitive may be used to replace the "NOS" primitive, as discussed in FC-FS.

SERDES 204, 205, 206 and 207 converts parallel 10 bit characters into a serial stream on the transmit side (i.e. data to the network) and converts data received by switch element 20 into 10-bit characters. SERDES 204-207 recover clock information from data that is received by a port.

In one aspect of the present invention, for a 20 G operation, 4 serial streams (i.e., four transmit and four receive lanes) (as shown in FIG. 2 with SERDES 204-207) at 6.375 G may be used. Each lane encodes/decodes a byte of data using 8 B/10 B code. The 20 G ports may be connected through passive copper, actively driven copper or optical at the same or different wavelengths (one wavelength for each lane) paths (not shown).

For a 40 G operation, 4 serial streams each at 12.75 G may be used. Each lane encodes/decodes a byte of data using 8 B/10 B code. The four lanes are synchronized and aligned, as described in the aforementioned patent application.

It is noteworthy that the invention is not limited to any particular number of serial streams; for example, a single stream may be used to operate a port at 20 G/40 G or any other rate. Also, the serial streams may operate at the same optical wavelength or different wavelengths; one for each serial stream.

SERDES 204-207 clock rates are manipulated to facilitate higher speed operation. Currently the XAUI interface (incorporated herein by reference in its entirety) supports 10 G operation using four transmit and four receive lanes; each lane encoding data with an 8 B/10 B code for differential serial transmission and operating at 3.1875 GigaBaud. To operate at higher speeds, a full rate will be at 12.75 GigaBaud, half rate will be at 6.375 GigaBaud. The full rate, half and quarter rates are selected by module 202, based on signal 201.

Cut-Through Routing at Higher Speeds:

"Cut" bits are a status signal sent from receive to transmit buffers to keep the transmit buffer running as quickly as possible by either guaranteeing that the transmit port either does not run out of data or by allowing the transmit port to re-arbitrate its tags to select a frame source that has the "cut" bit set. The use of cut bits at lower rates (i.e., 1 G, 2 G, 4 G and 10 G) is described in the aforementioned patent application. The Cut Bits may be expanded to include 20 G, 40 G or higher transfer rates.

To reduce latency, a frame is released from a receive buffer, after a certain threshold value is reached. However, if the receive buffer slots become almost full with other frames, then new incoming frames wait for the end of frame ("EOF"). This reduces contention time on shared resources that may occur if the receive buffer is tied up for "cut" through routing.

There are different conditions on cut status depending on what kind of port the Receive Buffer resides in (for example, 10 G/20 G/40 G or any other speed). The selection of cut status also depends on the type of port the Transmit Port resides in. Table I in FIG. 3, shows how some cut through frame length calculations are performed depending upon port transfer rates.

In one aspect of the present invention, a port can be configured to operate at different rates. High bandwidth operation is permitted for better performance.

Although the present invention has been described with reference to specific embodiments, these embodiments are illustrative only and not limiting. Many other applications and embodiments of the present invention will be apparent in light of this disclosure and the following claims.

What is claimed is:

1. A device, comprising:
    a plurality of ports for sending and receiving frames, wherein each port is configurable to operate at more than one operating speed; and
    a rate select module that receives a select speed signal from a common port of the device generated by firmware executed by a device processor, and based on the select speed signal, the rate select module provides a clock and a configuration signal to select an operating rate of a serializer/deserializer (SERDES) from among a plurality of SERDES to configure a port from among the plurality of ports to operate at a rate equal to or higher than 10 gigabits per second ("G").

2. The device of claim 1, wherein the device is a switch.

3. The device of claim 1, wherein the port is configured to operate at 20 G (gigabits per second), or 40 G, or a rate greater than 40G (gigabits per second).

4. The device of claim 1, wherein the port configured to operate at a rate equal to or greater than 10 G negotiates a transfer rate with other ports.

5. The device of claim 1, wherein a cut status is used for cut-through routing between ports operating at different speeds.

6. The device of claim 1, wherein a plurality of transmit and receive lanes are used for port operation at a rate equal to or higher than 10 G.

7. The device of claim 6, wherein for 20 G operation each lane operates at 6.375 Gigabaud, and for 40 G operation each lane operates at 12.75 Gigabaud.

8. The device of claim 6, wherein ports configured to operate at 20 G and 40 G port are connected using passive copper or actively driven copper paths.

9. The device of claim 6, wherein ports configured to operate at 20 G and 40 G port are connected using optical transmission at the same or different wavelengths when multiple serial streams are used.

10. A network, comprising:
    a device including a plurality of ports for sending and receiving frames, wherein each port is configurable to operate at more than one operating speed; and
    a rate select module that receives a select speed signal from a common port of the device generated by firmware executed by a device processor, and based on the select speed signal, the rate select module provides a clock and a configuration signal to select an operating rate of a serializer/deserializer (SERDES) from among a plurality of SERDES to configure a port from among the plurality of ports to operate at a rate equal to or higher than 10 gigabits per second ("G").

11. The network of claim 10, wherein the device is a switch.

12. The network of claim 10, wherein the port is configured to operate at 20 G (gigabits per second), or 40 G, or a rate greater than 40 G (gigabits per second).

13. The network of claim 10, wherein the port configured to operate at a rate equal to or greater than 10 G negotiates a transfer rate with other ports.

14. The network of claim 10, wherein a cut status is used for cut-through routing between ports operating at different speeds.

15. The network of claim 10, wherein a plurality of transmit and receive lanes are used for port operation at a rate equal to or higher than 10 G.

16. The network of claim 15, wherein for 20 G operation each lane operates at 6.375 Gigabaud, and for 40 G operation each lane operates at 12.75 Gigabaud.

17. The network of claim 15, wherein ports configured to operate at 20 G and 40 G port are connected using passive copper or actively driven copper paths.

18. The network of claim 15, wherein ports configured to operate at 20 G and 40 G port are connected using optical transmission at the same or different wavelengths when multiple serial streams are used.

* * * * *